Dec. 10, 1963 L. L. REED 3,113,504
OUTDOOR GRILL
Filed Aug. 8, 1960 3 Sheets-Sheet 1
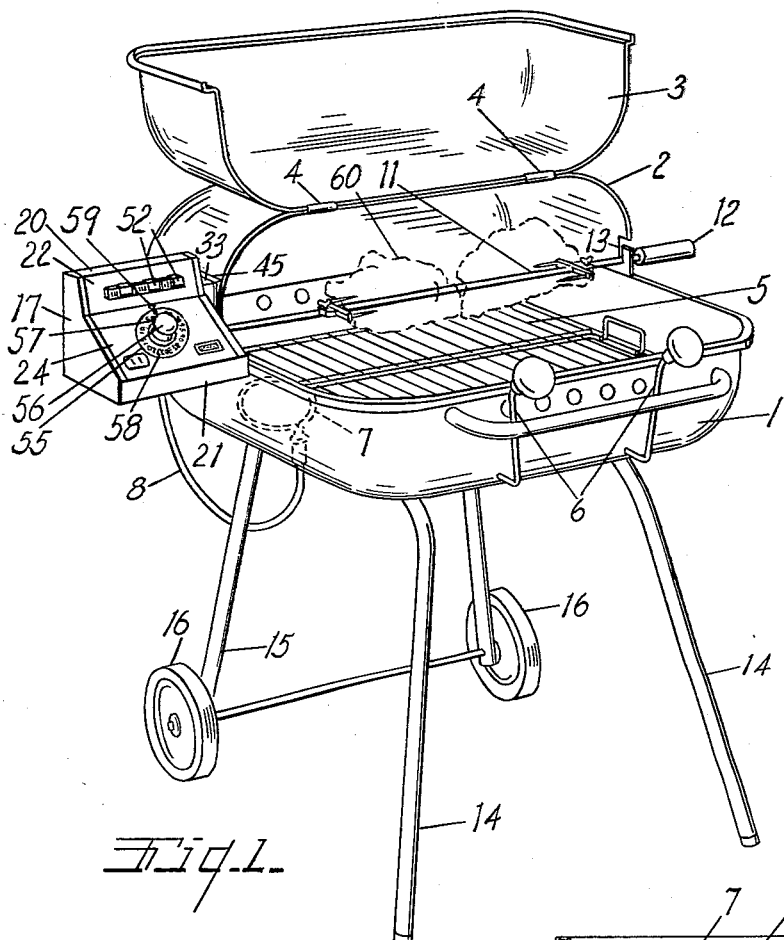
Fig. 1.
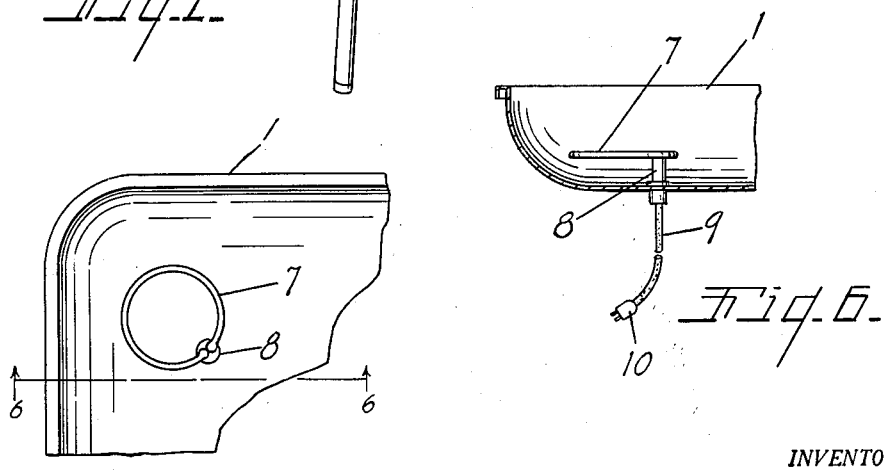
Fig. 5.
Fig. 6.
INVENTOR.
Linwood L. Reed
BY
Otto A. Earl
ATTORNEY.

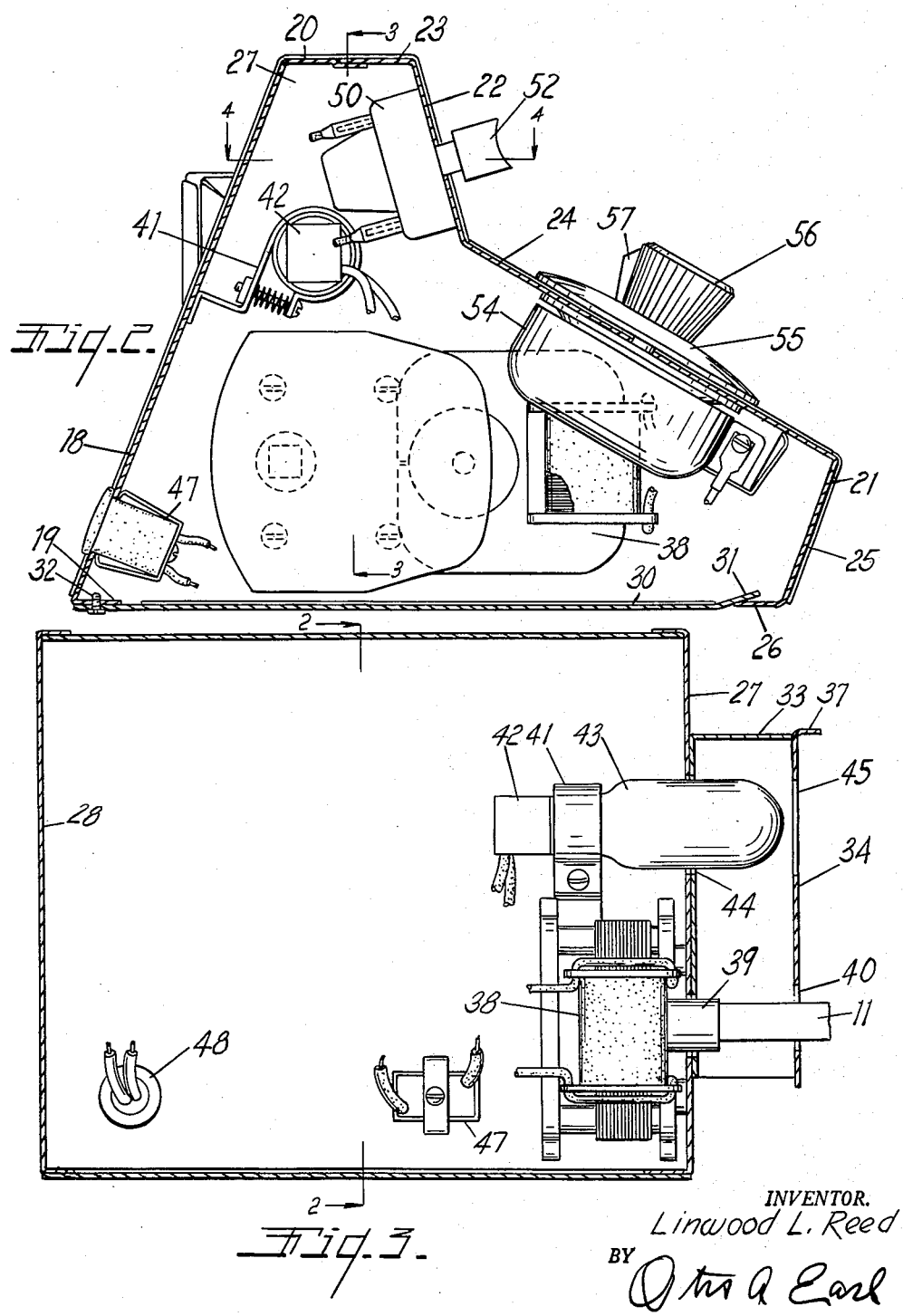

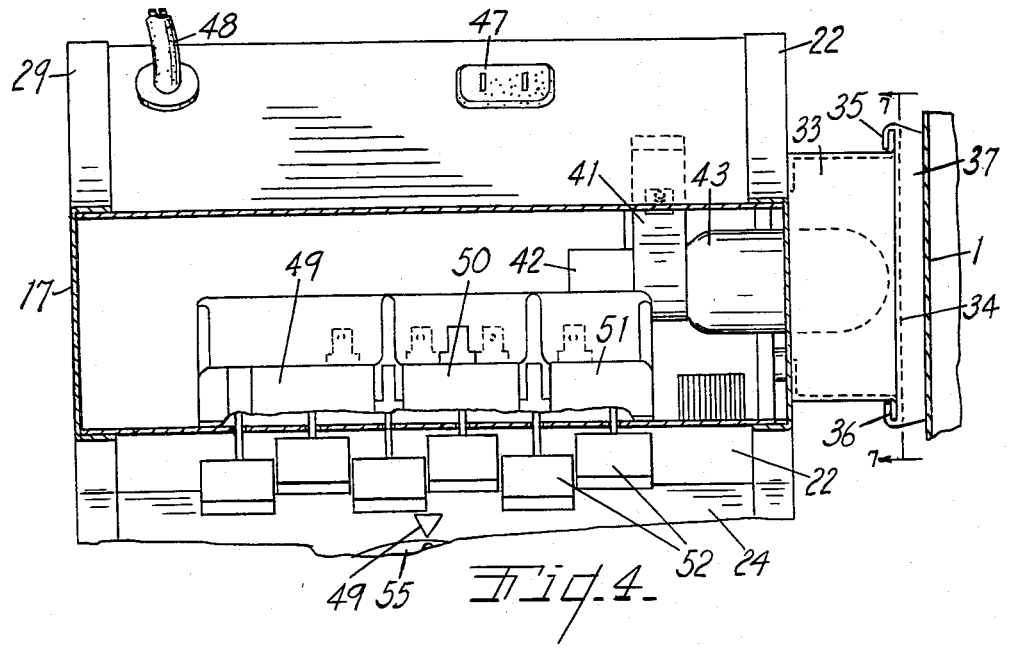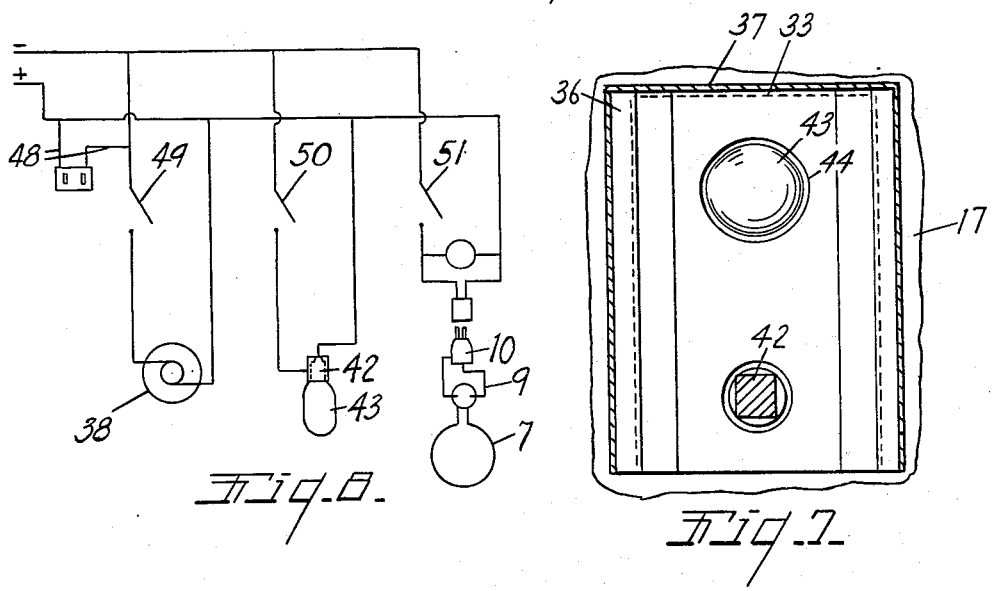

United States Patent Office

3,113,504
Patented Dec. 10, 1963

3,113,504
OUTDOOR GRILL
Linwood L. Reed, Albion, Mich., assignor to Union Steel Products Company, Albion, Mich.
Filed Aug. 8, 1960, Ser. No. 48,172
4 Claims. (Cl. 99—421)

This invention relates to grills of the outdoor type.

The main objects of this invention are:

First, to provide a grill including a motor or power driven spit with controls for the driving means which are conveniently located for manipulation and easily operated.

Second, to provide a grill having these advantages which includes a firepan, an electric fuel igniter unit supportedly mounted therein, and a lamp for illuminating the interior of the grill and spit driving means, all being electrically powered and switch controlled, the switches being mounted in side by side relation in a single housing.

Third, to provide an outdoor grill having these several features with audible time signal means and including a manually adjustable timer member provided with time indicia.

Fourth, to provide a grill embodying these several features in which the spit driving means, the igniter control means, the lamp supporting means are all housed in a relatively compact housing unit which as a unit is detachably mounted on the grill.

Objects relating to details and economies of the invention will appear from the description to follow. The invention is defined and pointed out in the claims.

A preferred embodiment of the invention is illustrated in the accompanying drawing, in which:

FIG. 1 is a front perspective view of a grill embodying my invention with the hood in open position and with objects to be cooked conventionally indicated on the spit by dotted lines.

FIG. 2 is a vertical transverse section on a line corresponding to line 2—2 of FIG. 3, certain parts being shown conventionally.

FIG. 3 is a view in vertical section on a line corresponding to line 3—3 of FIG. 2, certain parts being omitted.

FIG. 4 is a fragmentary view on a line corresponding to line 4—4 of FIG. 2, certain of the parts being shown conventionally.

FIG. 5 is an enlarged top or plan view of the firepan illustrating the relationship of the igniter therein.

FIG. 6 is a fragmentary sectional view on a line corresponding to line 6—6 of FIG. 5.

FIG. 7 is a fragmentary view on a line corresponding to line 7—7 of FIG. 4, illustrating certain structural details.

FIG. 8 is a diagrammatic view of the wiring and control switches for the spit driving motor, the grill lamp and the igniter, also a plug-in socket for other electrical devices, illuminating lamps or the like.

The grill of the embodiment of my invention illustrated is substantially that illustrated in the Gauss application for patent, Serial No. 7,785, filed February 10, 1960, now Patent 3,048,162 issued August 7, 1962, and therefore certain structural details of the grill illustrated, generally considered, form no part of my present invention but are included as illustrating a commercial embodiment of my invention.

The grill illustrated comprises a firepan designated generally by the numeral 1, a hood, the rear section 2 of which is fixedly mounted on the firepan and the front section 3 of which is hinged to the front edge of the top of the rear section by the hinges 4. The grid designated generally by the numeral 5 is mounted for vertical adjustment and details of the mounting are not illustrated. The manually manipulated adjusting means are designated by the numeral 6.

I provide an annular electric fuel igniter unit 7 which is supported by the post-like support 8 mounted on the bottom of the pan, see FIGS. 5 and 6. The electrical or circuit connection 9 terminates in a plug 10 which is adapted to be connected to the source of power as will appear as the description proceeds. The spit 11 is desirably of rectangular cross section and is adapted to be inserted through or otherwise support material to be cooked, as indicated by dotted lines 60.

The spit is provided with a handle 12 at one end and is supportedly engageable with the fixed portion 2 of the hood which is provided with a keyhole or angled slot 13 in the front edge of one side wall thereof, see FIG. 1. The firepan, in the embodiment illustrated, is provided with front supporting legs 14 and rear legs 15 which are provided with wheels 16 to facilitate transportation.

The motor and switch housing designated generally by the numeral 17 comprises rear wall 18 which is forwardly inclined and terminates in a forwardly projecting flange 19 at its lower end and in integral top wall section 20 at its upper end. The front wall designated generally by the numeral 21 comprises the upper panel or section 22 which has a rearwardly projecting top wall portion which terminates at 23 to lappingly engage or receive the top wall portion 20, see FIG. 2. The panel portion 24 of the front wall is disposed in angular relation to the panel portion 22 and it terminates at its lower edge in a rearwardly inclined panel 25 which has a rearwardly projecting flange 26 at its lower end.

The inner and outer end walls 27 and 28 are conformed to fit the front top and rear walls and are provided on their top, front and rear edges with inturned flanges 29 which overlap end portions of the top, rear and front walls. The bottom 30 is detachable and is provided with an upturned portion 31 on its front edge which supportedly overlaps the rearwardly turned flange 26 on the front wall. The bottom is detachably secured to the inturned flange 19 on the rear wall by means of screws 32.

The housing is designed not only from the matter of providing a housing for certain parts but for compactness and in order that certain control parts mounted thereon may be conveniently positioned for viewing and manipulation.

At its inner end the hood is provided with a chambered mounting bracket 33 fixedly secured to the outer side of the inner end wall 27. The side wall of the hood adjacent the housing is provided with a support or bracket 34 provided with inwardly facing vertical ways 35 adapted to receive the outwardly projecting flanges 36 on the side wall of the bracket 33, see FIG. 4. This supporting bracket 34 is bolted or otherwise attached to the side wall of the hood and is provided with an inturned flange 37 on its top edge which abuts the fixed section 2 of the hood, see FIG. 1. The attaching means for the bracket 34 to the hood are not illustrated but commonly bolts are used. It will be noted that the flanges 36 in the side walls of the bracket 33 project laterally, see FIG. 4, so that they may be engaged and disengaged with the ways 35 by a vertical sliding movement. The flange 37 of the bracket engages the hood.

Mounted within the hood is an electrically powered spit driving motor, designated by the numeral 38, the details of this motor are not illustrated as it forms no part of this invention except that the motor is provided with a spit driving socket 39 facing the grill and adapted to receive the end of the spit 11, the bracket 34 being provided with a spit receiving hole 40 aligned with the socket, see FIG. 3. The spit driving means includes speed reducing means so that the spit is rotatably driven at the desired speed which commonly is quite slow.

Mounted on the rear wall of the housing 17 is a supporting bracket 41 for the lamp socket 42, the lamp 43 being supported by this socket so that it projects through an opening 44 provided therefor in the inner wall 37 of the housing 17 and into the mounting bracket 33 which is fixedly mounted on the housing, see FIG. 3. The support 34 mounted on the hood is provided with an opening 45 aligned with the bulb so that the interior of the grill is illuminated.

The igniter circuit connection 9 is connected to the plug socket designated generally by the numeral 47 on the rear wall of the housing, see FIG. 3. 48 designates the source of current connection. The details of the wiring connections are not included in FIGS. 2, 3 and 4. It will be understood that it is desirable that the igniter be on only until it has served its purpose of igniting the fuel, commonly and desirably charcoal, and that the lamp is not always necessary so separate switches are provided for the igniter, lamp and spit driving motor and these are mounted on the inner side of the upper panel 22 of the front wall. These switches are conventionally shown as their structural details form no part of this invention and suitable switches are available. However, the switch designated 49 is the motor switch, switch 50 the light switch and 51 the igniter switch. These switches are provided with "On" and "Off" push buttons designated generally by the numeral 52, see FIG. 4. Desirably these push buttons are of different colors to indicate the "On" and "Off" although it will be appreciated that they might have the letters ON and OFF.

To facilitate the use of the grill in the cooking of various products which require cooking for different periods or length of time I provided a time signal, designated generally by the numeral 54, which is mounted on the inner side of the front wall panel 24 and is provided with a rotatably manually adjustable time indicia member 55 disposed on the outer side of the panel and provided with a finger piece 56 having a pointer 57 thereon. The timer and indicia member 55 is provided with indicia 58, the embodiment illustrated having uniformly spaced numbers ranging from 0 to 55. The panel is provided with a pointer 59. The relation of the parts relative to the current source and the switches is illustrated in FIG. 8. The structural details of the time signal unit designated generally by the numeral 54, are not illustrated or described as that is a unit which is commercially available, and the applicant make no claim of patentable novelty to the structural details of such unit which is adaptable for use in the applicant's combination.

With this arrangement of parts a very effective and conveniently operated or manipulated grill is provided and one which may be efficiently used under widely varying conditions.

I have illustrated and described my invention in a highly practical commercial embodiment thereof. I have not attempted to illustrate various modifications and adaptations as it is believed this disclosure will enable those skilled in the art to embody or adapt the invention as may be desired.

Having thus described the invention, what is claimed as new and desired to secure by Letters Patent is:

1. An outdoor grill comprising a fire pan, side members projecting upwardly therefrom with their front edges spaced rearwardly from the front end thereof, one side member having a spit receiving opening therein and the other a spit receiving slot, an electric fuel igniter unit supportedly mounted in said fire pan, a motor and switch housing including a front wall, a chambered mounting bracket fixedly secured to said housing and detachably mounted on said side member having the spit receiving opening therein, an electrically powered spit driving motor mounted within said housing and including a rotatably driven member having a spit receiving socket therein aligned with said spit receiving opening in said side member, a lamp unit comprising a socket mounted within said housing and a bulb, said housing having an opening therein through which said bulb projects into said chambered supporting bracket, the adjacent wall of the hood having an opening therein aligned with the lamp, control switches for said motor, and said igniter and said lamp mounted within said housing and having on and off push buttons projecting through said front wall for manual manipulation from the outside of said housing, and a sound signal means mounted within said housing and including a rotatably manually adjustable time signal setting member mounted on the outer side of said front wall and provided with time indicia.

2. An outdoor grill comprising a fire pan, side members projecting upwardly therefrom with their front edges spaced rearwardly from the front end thereof, one side member having a spit receiving opening therein and the other a spit receiving slot, an electric fuel igniter unit supportedly mounted in said fire pan, a motor and switch housing including a front wall, a chambered mounting bracket fixedly secured to said housing and detachably mounted on said side member having the spit receiving opening therein, an electrically powered spit driving motor mounted within said housing and including a rotatably driven member having a spit receiving socket therein aligned with said spit receiving opening in said side member, a lamp unit comprising a socket mounted within said housing and a bulb, said housing having an opening therein through which said bulb projects into said chambered supporting bracket, the adjacent wall of the hood having an opening therein aligned with the lamp, control switches for said motor, and said igniter and said lamp mounted within said housing and having on and off push buttons projecting through said front wall for manual manipulation from the outside of said housing.

3. An outdoor grill comprising a fire pan, side members projecting uwpardly therefrom with their front edges spaced rearwardly from the front end thereof, one side member having a spit receiving opening therein and the other a spit receiving slot, a motor and switch housing including a front wall, a chambered mounting bracket fixedly secured to said housing and detachably mounted on said side member having the spit receiving opening therein, an electrically powered spit driving motor mounted within said housing and including a rotatably driven member having a spit receiving socket therein aligned with said spit receiving opening in said side member, a lamp unit comprising a socket mounted within said housing and a bulb, said housing having an opening therein through which said bulb projects into said chambered supporting bracket, the adjacent wall of the hood having an opening therein aligned with the lamp, control switches for said motor and said lamp mounted within said housing and having on and off buttons projecting through said front wall for manual manipulation from the outside of said housing, and a timed sound signal driving means mounted within said housing and a rotatably manually adjustable time signal setting member therefor mounted on the outer side of said front wall and provided with time indicia.

4. An outdoor grill comprising a fire pan, side members projecting upwardly therefrom with their front edges spaced rearwardly from the front end thereof, one side member having a spit receiving opening therein and the other a spit receiving slot, a motor and switch housing including a front wall, a chambered mounting bracket fixedly secured to said housing and detachably mounted on said side member having the spit receiving opening therein, an electrically powered spit driving motor mounted within said housing and including a rotatably driven member having a spit receiving socket therein aligned with said spit receiving opening in said side member, a lamp unit comprising a socket mounted within said housing and a bulb, said housing having an opening therein through which said bulb projects into said chambered supporting bracket, the adjacent will of the hood having an opening therein aligned with the lamp, control switches for said motor and said lamp mounted within said housing and having on and off buttons projecting through said front wall for manual manipulation from the outside of said housing.

References Cited in the file of this patent

UNITED STATES PATENTS

| | | |
|---|---|---|
| 2,831,421 | Mile | Apr. 22, 1958 |
| 2,956,497 | Bernstein | Oct. 18, 1960 |
| 2,961,942 | Terry | Nov. 29, 1960 |

OTHER REFERENCES

Washington Star Newspaper, June 14, 1959, page A–25, 2nd and Virginia Ave., S.E., Washington, D.C.